(12) United States Patent
Yuan et al.

(10) Patent No.: US 9,177,024 B2
(45) Date of Patent: Nov. 3, 2015

(54) SYSTEM, METHOD, AND COMPUTER-READABLE MEDIUM FOR OPTIMIZING DATABASE QUERIES WHICH USE SPOOLS DURING QUERY EXECUTION

(75) Inventors: Heng Yuan, San Diego, CA (US); Mark Sirek, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 364 days.

(21) Appl. No.: 13/417,366

(22) Filed: Mar. 12, 2012

(65) Prior Publication Data
US 2013/0173592 A1 Jul. 4, 2013

Related U.S. Application Data

(60) Provisional application No. 61/580,973, filed on Dec. 28, 2011.

(51) Int. Cl.
*G06F 17/30* (2006.01)

(52) U.S. Cl.
CPC ................................ *G06F 17/30466* (2013.01)

(58) Field of Classification Search
USPC ......................................... 707/719, 713, 609
See application file for complete search history.

(56) References Cited

U.S. PATENT DOCUMENTS

| | | | | |
|---|---|---|---|---|
| 6,470,331 | B1 * | 10/2002 | Chen et al. | 707/718 |
| 6,944,633 | B1 * | 9/2005 | Higa et al. | 1/1 |
| 8,386,444 | B2 * | 2/2013 | Kraus et al. | 707/693 |
| 2013/0085984 | A1 * | 4/2013 | Burger et al. | 707/609 |

\* cited by examiner

*Primary Examiner* — Belix M Ortiz Ditren
(74) *Attorney, Agent, or Firm* — Michael Chan (57) ABSTRACT

A database system comprises a processing module, and a storage device communicatively coupled with the processing module and allocated thereto. The storage device stores a base table allocated to the processing module. The processing module receives a database query from a client computer system, and generates a spool based upon a number of columns of a table, and partitions at least one column of the spool based upon the database query received from the client computer system.

11 Claims, 6 Drawing Sheets

OPTIMIZING AN AGGREGATION TYPE OF QUERY

Figure 6

OPTIMIZING A SUB-SELECT TYPE OF QUERY

SYSTEM, METHOD, AND COMPUTER-READABLE MEDIUM FOR OPTIMIZING DATABASE QUERIES WHICH USE SPOOLS DURING QUERY EXECUTION

CROSS REFERENCE TO RELATED APPLICATIONS

This application claims priority under 35 U.S.C. §119(e) to the following commonly-assigned provisional patent application, which is incorporated herein by reference:

Provisional Patent Application Ser. No. 61/580,973, entitled "SYSTEM, METHOD, AND COMPUTER-READABLE MEDIUM FOR OPTIMIZING DATABASE QUERIES WHICH USE SPOOLS DURING QUERY EXECUTION" by Heng Yuan and Mark William Sirek; filed on Dec. 28, 2011.

TECHNICAL FIELD

The present disclosure relates to optimization of database queries, and is particularly directed to a system, method, and computer-readable medium for optimizing database queries which use spools during query execution.

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In some cases, tables in a relational database system may contain a very large amount of data. For example, large retail chains may operate relational databases that contain daily sales figures. The tables of daily sales figures may include millions or billions of rows and a large number of columns. There are a number of different ways to store tables. As examples, tables may be row-stored or column-partitioned. As other examples, tables may be row-partitioned or multi-level partitioned.

There are a number of known advantages for column-partitioned tables versus rows-stored tables. One advantage is less input/output due to the fact that only the columns that need to be accessed in a query are loaded from disk. Another advantage is that compression can work very well for certain columns, particularly for pre-sorted columns. However, there are also a number of known disadvantages of column-partitioned tables. One disadvantage is that the table is mostly well-suited for append operations, not for insert, delete, and update operations. Another disadvantage is that queries involving a lot of columns can actually cause performance degradation. A better access path is important because scanning all rows and/or columns in a large table is time-consuming and may impose an unacceptable load on computing resources.

SUMMARY

Disclosed embodiments provide a system, method, and computer readable medium for partitioning at least one column of the spool based upon the database query received from the client computer system. A database query is received from a client computer system. A spool is generated based upon a number of columns of a table. At least one column of the spool is partitioned based upon the database query received from the client computer system.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
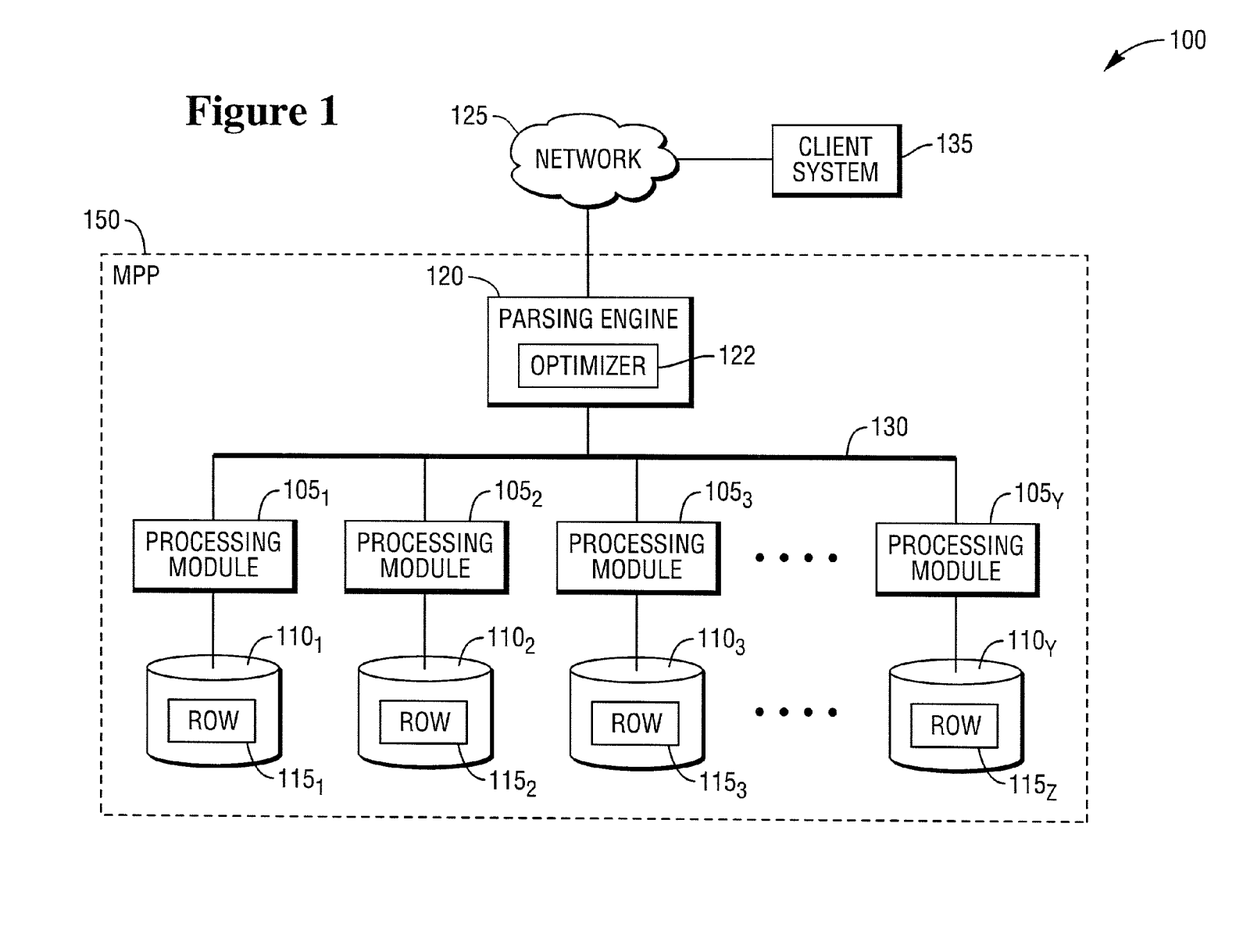
FIG. 1 depicts a diagrammatic representation of an exemplary architecture for a large database system that is suited for implementing optimized database queries which use spools in accordance with disclosed embodiments.

FIG. 1 depicts a diagrammatic representation of an exemplary architecture for a large database system 100, such as a Teradata Active Data Warehousing System, that is suited for implementing optimized database queries which use spools in accordance with disclosed embodiments. The database system 100 includes a relational database management system (RDBMS) built upon MPP system 150. Other types of database systems, such as object-relational database management systems (ORDBMS) or those built on symmetric multi-processing (SMP) platforms, are also suited for use. The depicted and described architecture is exemplary only and is chosen to facilitate an understanding of the disclosed embodiments.

As shown, the database system 100 includes one or more processing modules $105_1 \ldots _Y$ that manage the storage and retrieval of data in data-storage facilities $110_1 \ldots _Y$. Each of the processing modules $105_1 \ldots _Y$ may be one or more physical processors or each may be a virtual processor, such as an Access Module Processor (AMP), with one or more virtual processors running on one or more physical processors. For the case in which one or more virtual processors are running on a single physical processor, the single physical processor swaps between the set of virtual processors. For the case in which N virtual processors are running on an M-processor node, the node's operating system schedules the N virtual processors to run on its set of M physical processors. Each of the processing modules $105_1 \ldots _Y$ manages a portion of a database that is stored in corresponding data-storage facilities $110_1 \ldots _Y$. Each of the data-storage facilities $110_1 \ldots _Y$ includes one or more disk drives or other storage medium.

The database system 100 stores data in one or more tables in the data-storage facilities $110_1 \ldots _Y$. The rows $115_1 \ldots _Z$ of the tables are stored across multiple data-storage facilities $110_1 \ldots _Y$ to ensure that the system workload is distributed evenly across the processing modules $105_1 \ldots _Y$. A parsing engine 120 organizes the storage of data and the distribution of table rows $115_1 \ldots _Z$ among the processing modules $105_1 \ldots _Y$ and accesses processing modules $105_1 \ldots _Y$ via an interconnect 130. The parsing engine 120 also coordinates the retrieval of data from the data-storage facilities $110_1 \ldots _Y$ in response to queries received from a user, such as one using a client computer system 135 connected to the database system 100 through a network connection 125. The database system 100 typically receives queries in a standard format, such as the Structured Query Language (SQL) put forth by the American National Standards Institute (ANSI).

The parsing engine 120, on receiving an incoming database query, applies an optimizer component 122 to the query to assess the best plan for execution of the query. Selecting the optimal query-execution plan includes, among other things, identifying which of the processing modules $105_1 \ldots _Y$ are involved in executing the query and which database tables are involved in the query, as well as choosing which data-manipulation techniques will serve best in satisfying the conditions of the query. Database statistics are used in making these assessments during construction of the query-execution plan. For example, database statistics may be used by the optimizer to determine data demographics, such as attribute minimum and maximum values and data ranges of the database.

Figure 2:
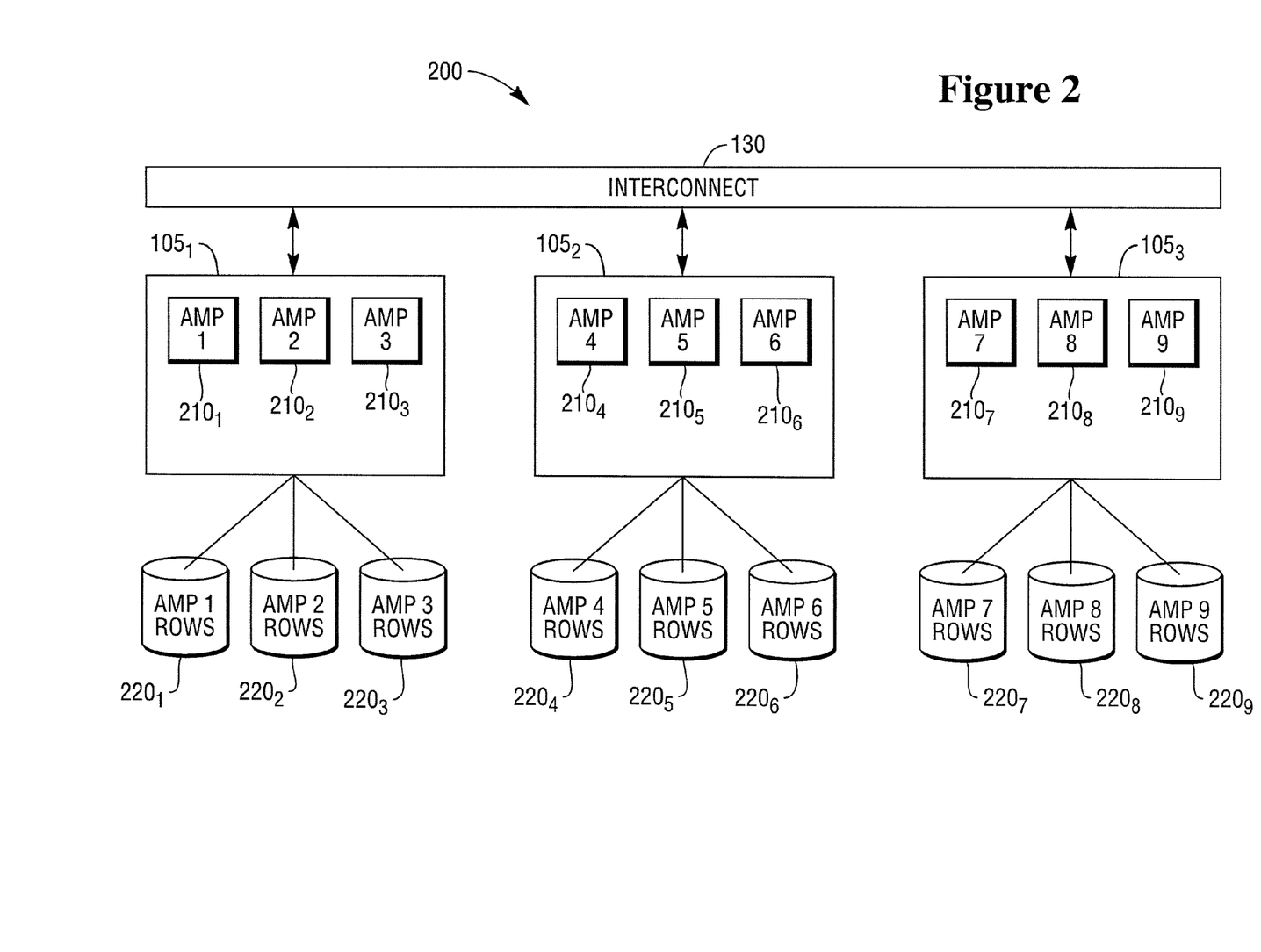
FIG. 2 is a diagrammatic representation of a massively parallel processing system configuration suitable for implementing optimized database queries which use spools in accordance with disclosed embodiments.

FIG. 2 is a diagrammatic representation of an MPP configuration 200 suitable for implementing optimized database queries which use spools in accordance with disclosed embodiments. In the illustrative example, each of the processing modules $105_1$-$105_3$ are each configured with three respective AMPs $210_1$-$210_9$. The rows $115_1 \ldots _Z$ of a table have been distributed across the nine AMPs $210_1$-$210_9$ hosted by processing modules $105_1$-$105_3$ such that each of the AMPs is allocated rows $220_1$-$220_9$.

Figure 3:
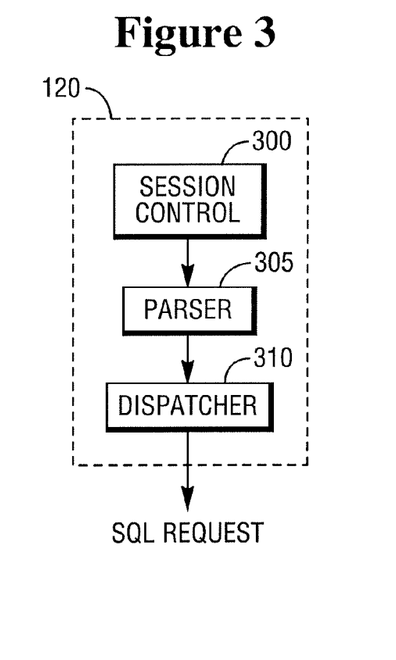
FIG. 3 is a diagrammatic representation of a parsing engine implemented in accordance with an embodiment.
Figure 4:
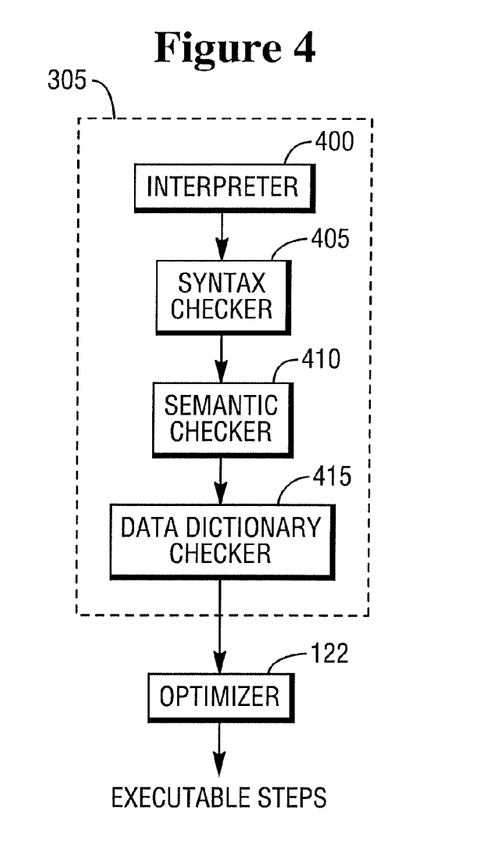
FIG. 4 is a diagrammatic representation of parser processing implemented in accordance with an embodiment.

In one example system, the parsing engine 120 is made up of three components: a session control 300, a parser 305, and a dispatcher 310, as shown in FIG. 3. The session control 300 provides the logon and logoff function. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request.

An element of the Teradata Active Data Warehousing System available is the "primary index" column that the database system's user assigns for each table. The database system hashes the rows of each table, using the primary index column as the basis for the hash, and distributes the rows among the data storage facilities $110_1 \ldots _Y$ based on the hash results. If the primary index column is properly selected, the distribution technique evenly distributes the rows of each table across all of the data storage facilities $110_1 \ldots _Y$ in the system. This is true if the chosen primary index column has unique values, producing a unique primary index (UPI), but is not always true if the chosen primary index column has non-unique values, producing a non-unique primary index (NUPI). The same hashing technique is used to retrieve rows of data from a table, as the primary index provides a path to the rows of a table.

The Teradata Active Data Warehousing System also provides a secondary index capability, which provides an alternative path to the rows of a table. A table can have more than one secondary index. Unlike a primary index, a secondary index does not affect the distribution of table rows among data storage facilities $110_1 \ldots _Y$. In particular, secondary indexes including NUSI (Non-Unique Secondary Index) are introduced for faster set selection and implemented on an AMP-local basis. Each AMP $210_1$-$210_9$ manages the NUSI sub-table rows that correspond to base table rows located on that AMP only. The distribution of a NUSI sub-table row is based on the Primary Index of its base row so that the system can access the NUSI row and the corresponding base row on the same AMP. However, in some cases, it is more beneficial to sort the NUSI sub-table rows by data values rather than by hash code, so called "Value-ordered NUSI". This is accomplished through a user-specified syntax option in the CREATE INDEX command syntax. In general, with each NUSI sub-table, the index rows may be ordered based on their a) NUSI hash code, or b) the NUSI data value itself.

Figure 5:
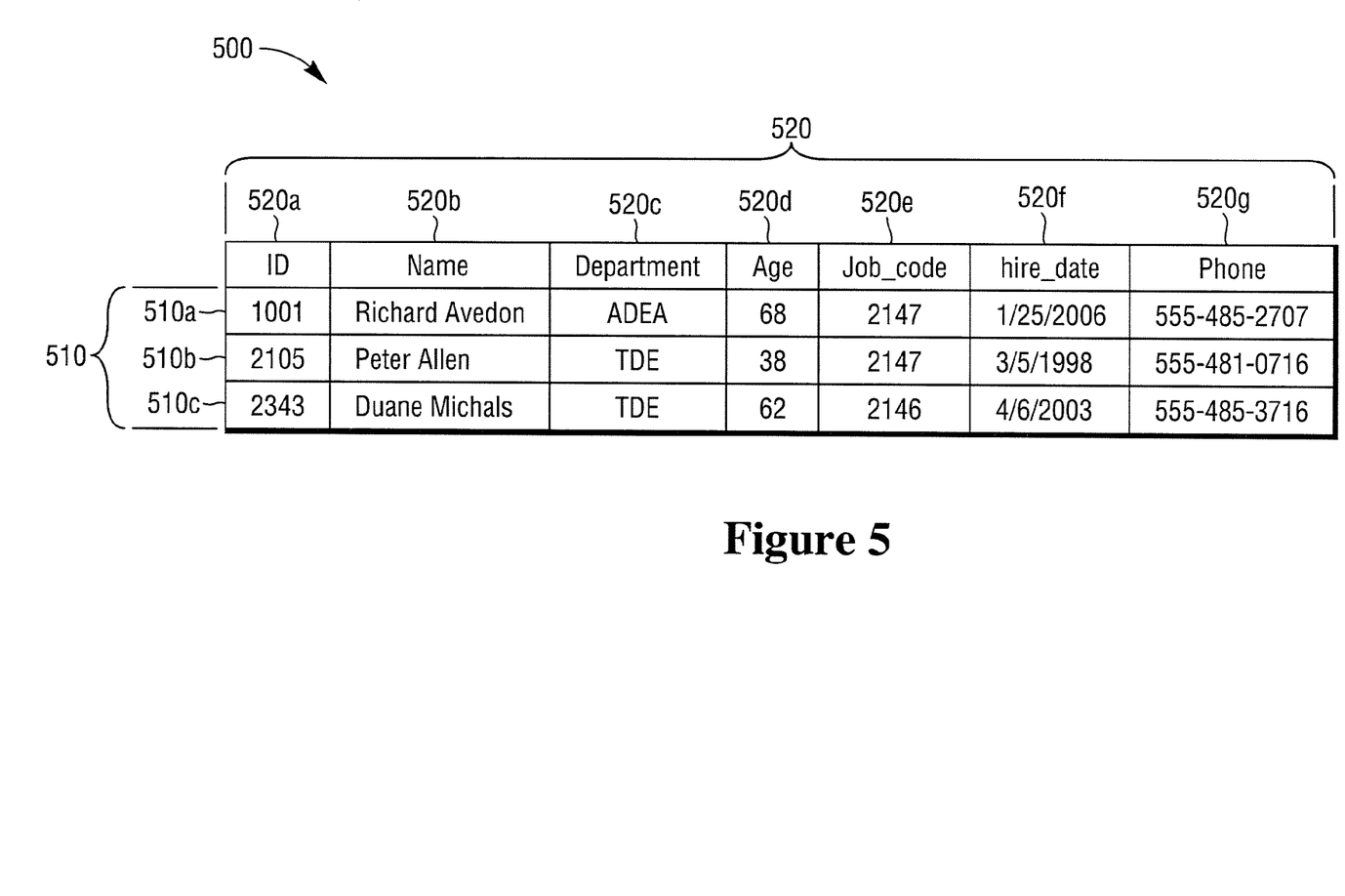
FIG. 5 is a diagrammatic representation of an example table on which the performance of a database query which uses spools may be improved in accordance with disclosed embodiments.

FIG. 5 is an example diagrammatic representation of an employee table 500, or a portion thereof. Table 500 comprises a plurality of records 510a-510c (collectively referred to as records 510) and fields 520a-520g (collectively referred to as fields 520). Each record 510 comprises data elements in respective fields 520. Table 500 includes fields 520 having respective labels of "ID", "Name", "Department", "Age", "Job_code", "hire_date", and "Phone." Data elements of a particular field typically share a common data type, e.g., string, integer, float, etc.

During complex database queries, spools are usually generated for storing intermediate results. These spools can be very big and thus cost significant disk space as well as incur significant disk input/output costs. In accordance with disclosed embodiments, a database query optimization method is provided for queries which use spools. Spools are column-partitioned to facilitate performance enhancement in a MPP system. Column-partitioned spools can be used to significantly boost query performances by reducing the size of the spool and reducing the input/output costs.

When looking at spools, the disadvantages of column store disappear in most cases. Typically, spools are created via append operations. Also typically, spools are read-only once created. Spools are temporary, and do not undergo costly deletions and updates. In many cases, spool rows are sorted by the operation that creates it, so the overhead of compressing column values is small. Further, there are many queries that only involve a subset of spools columns, such as aggregations and sub-selects.

An example aggregation type of query is as follows:
SELECT b, a, SUM (c), SUM (d)
FROM T
GROUP BY b, a;

In the above example query, a spool will be generated with columns "b", "a", "c", and "d". With a column partition for each column in spool, there are a number of advantages. One advantage is that because "b" is the first GROUP BY column, spool rows with the same value in column "b" will be generated sequentially, resulting in a great compression opportunity for the column, and thus reducing the overall size of the spool. Another advantage is that both "SUM (c)" and "SUM (d)" can be computed more efficiently, thereby reducing input/output significantly and thus improving the performance. The sums are limited to only the rows in a group. Rows included in the computations are identified via RowIDs from accessing columns "b" and "a".

An example query involving sub-selects is as follows:
SELECT t1.a, t3.c
FROM t1,
(SELECT b, c
FROM t2
WHERE d>100) t3
WHERE t1.b=t3.b;

In the above example query, a spool will be generated with columns "b" and "c". With a column-partitioned sub-query spool, only the data for "t3.b" in spool needs to be accessed during join between t1 and t3, thereby reducing the input/output.

Figure 6:
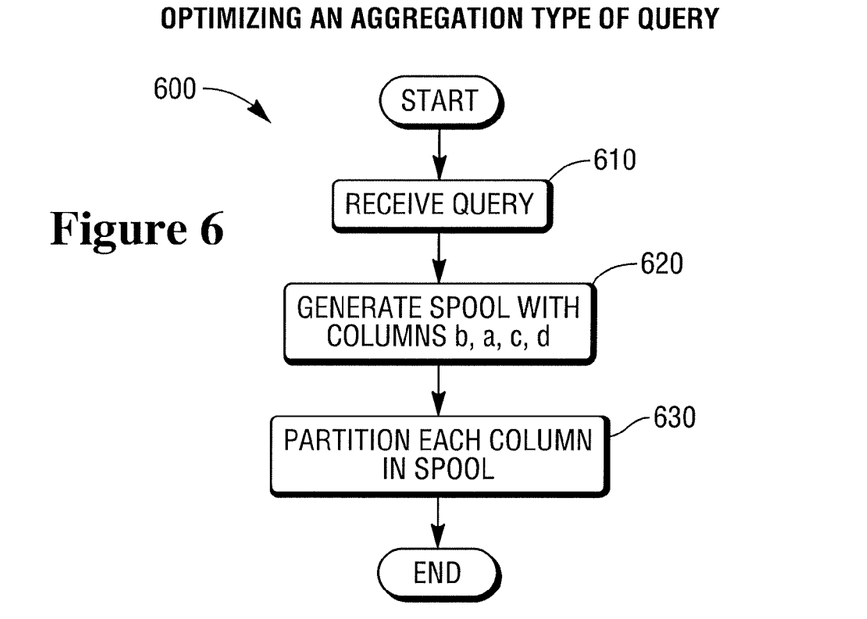
FIG. 6 is a flowchart that depicts processing of an example aggregation type of query routine that facilitates performance enhancement in a parallel processing system in accordance with an embodiment.

FIG. 6 is a flowchart 600 of an example aggregation type of query routine implemented in accordance with disclosed embodiments. The processing steps of FIG. 6 may be implemented as computer-executable instructions tangibly embodied on a computer-readable medium executable by a processing system, such as one or more of the AMPs $210_1$-$210_9$ depicted in FIG. 2.

In step 610, an aggregation type of query is received from the client computer system 135 (FIG. 1). Then, in step 620, a spool with at least one column is generated. In the example aggregation type of query described hereinabove, a spool with columns "b", "a", "c", "d" is generated. Each column of the spool generated in step 620 is then partitioned, as shown in step 630.

Figure 7:
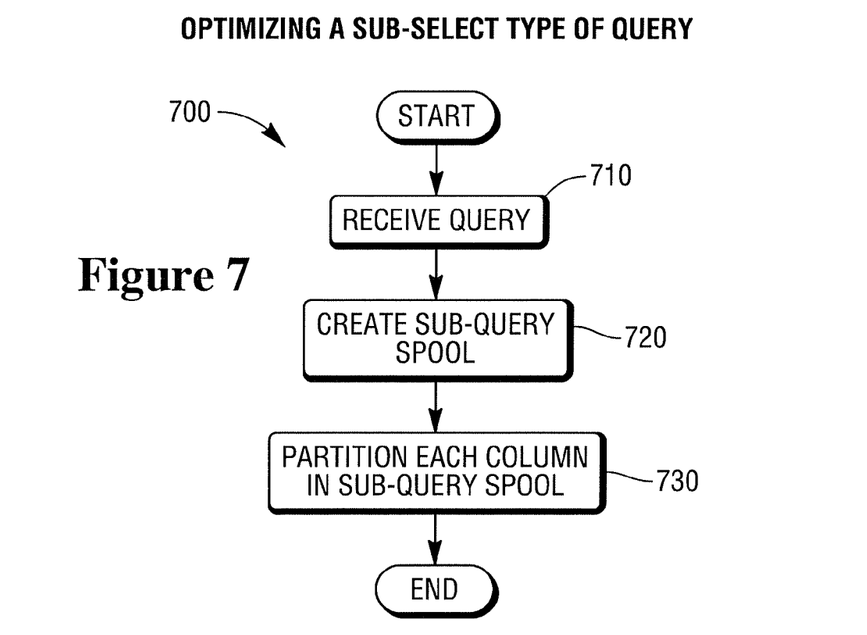
FIG. 7 is a flowchart that depicts processing of an example sub-select type of query routine that facilitates performance enhancement in a parallel processing system in accordance with an embodiment.

FIG. 7 is a flowchart 700 of an example sub-select type of query routine implemented in accordance with disclosed embodiments. The processing steps of FIG. 7 may be implemented as computer-executable instructions tangibly embodied by the computer-readable medium executable by a processing system, such as one or more of the AMPs $210_1$-$210_9$ depicted in FIG. 2.

In step 710, a sub-select type of query is received from the client computer system 135 (FIG. 1). Then, in step 720, a sub-query spool with at least one column is generated. Each column of the spool generated in step 720 is then partitioned, as shown in step 730.

It should be apparent that the above description describes two different example queries (i.e., an aggregate type of query and a sub-select type of query). Each example query is optimized by using an associated column-partitioned spool. It is conceivable that other types of queries may be optimized. If certain column(s) is/are used separately from the rest of the columns, then it is possible to use a column-partitioned spool to optimize the query.

Columns may be partitioned using any combination of a number of different criteria to optimize a query. As an example, columns may be partitioned based upon size of the columns. As another example, columns may be partitioned based upon some or all of the predicates of the particular query. As yet another example, columns may be partitioned based upon a fixed-predetermined definition. Alternatively, columns may be partitioned based upon a user-defined or user-preferred definition. These are only example criteria by which columns may be partitioned, and other criteria are possible.

Also, any number of different partitions may be generated from which one partition is selected. As an example, a number of different partitions may be first generated using statistics, and then the "best" partition is selected based upon the statistics. As another example, a number of different partitions may be generated using heuristics to provide a score for each generated partition, and then the partition with the highest score is selected. As yet another example, a number of different partitions may be enumerated based upon all possible combinations columns, and then one of the partitions is selected based upon a scoring mechanism. Different statistics, different techniques of heuristics, and different types of scoring mechanisms are known and, therefore, will not be described. These are only example ways of generating partitions and selecting one of the partitions, and other ways are possible.

An optimizer routine may determine the optimal number of column partitions for the spool table. With statistics on the base table, it is possible to estimate the saving of the compression. If the amount of saving is not worth the central processor unit (CPU) cost, then the optimizer may choose not to compress certain columns. Based on the query, the optimizer may choose to group certain columns together in the partitioning. In the worst-case, the optimizer may choose not to use a column-partitioned spool at all when all columns are included in the same partition.

Figure 8:
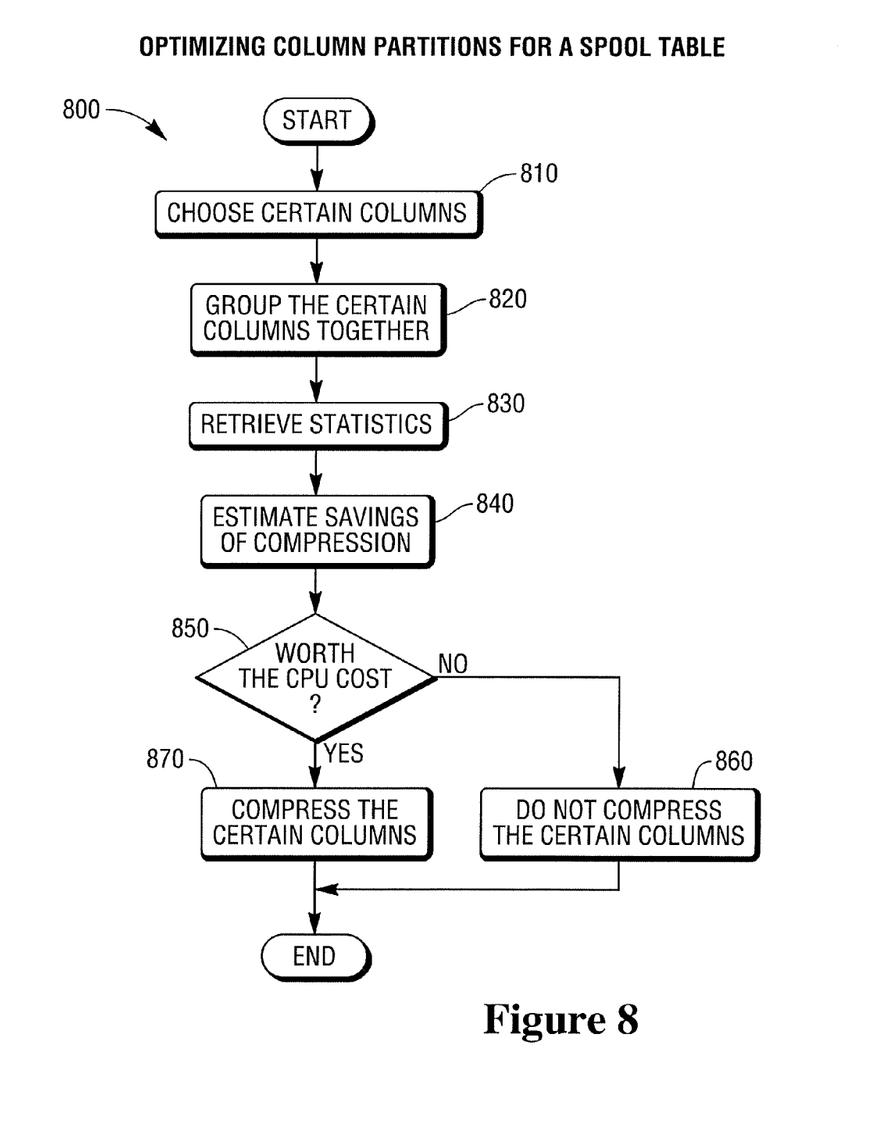
FIG. 8 is a flowchart that depicts processing of an example routine that optimizes column partitions for a spool table to facilitate performance enhancement in a parallel processing system in accordance with an embodiment.

FIG. 8 is a flowchart 800 of an example routine that optimizes column partitions for a spool table. In step 810, certain columns are chosen and grouped together as shown in step 820. In step 830, statistics associated with the base table are retrieved. An estimation of savings of compression is determined in step 840. A determination is then made in step 850 as to whether the estimated savings of compression in step 840 is worth the CPU cost. If the determination in step 850 is negative (i.e., the estimated savings of compression is not worth the CPU cost), then the process proceeds to step 860. In step 860, the certain columns are not compressed. The process then ends.

However, if the determination back in step 850 is affirmative (i.e., it is worth the CPU cost), then the process proceeds to step 870 in which the certain columns are compressed. The process then ends.

It should be apparent that the above description describes query optimization methods, computer-readable media, and systems that facilitate performance enhancement in a MPP system. The query optimization methods, media, and systems are applicable to a wide variety of queries that use spools during query execution. These properties are independent of how base tables are stored. For example, the base table could be row-stored, column-partitioned, row-partitioned, or multi-level partitioned.

It should also be apparent that input/output is reduced since intermediate spool size can be much smaller. Query performance, particularly for OLAP queries, can be much better due to significantly less input/output. Also, cache utilization can be better.

Each of the above-described flowcharts depicts process serialization to facilitate an understanding of disclosed embodiments and is not necessarily indicative of the serialization of the operations being performed. In various embodiments, the processing steps described in each of the flowcharts above may be performed in varying order, and one or more depicted steps may be performed in parallel with other steps. Additionally, execution of some processing steps of each of the flowcharts above may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A database system comprising:
   a processing module; and
   a storage device communicatively coupled with the processing module and allocated thereto that stores a base table allocated to the processing module, wherein the processing module receives a database query from a client computer system, generates a spool based upon a number of columns of a table, and partitions at least one column of the spool based upon the database query received from the client computer system; and
   wherein the processing module estimates saving of compression based upon statistics associated with the table, and compresses certain columns when the estimated saving of compression is greater than a predetermined value.

2. A system according to claim 1, wherein the processing module groups certain columns together in the partitioning based upon the database query received from the client computer system.

3. A system according to claim 1, wherein the processing module determines if all columns are included in the same partition, and partitions at least one column of the spool only if a determination is made that all columns are not included in the same partition.

4. A method of optimizing of an aggregation type of database query which uses spools in a computer system, the method comprising:
   receiving an aggregation type of database query from a client computer system;
   generating a spool based upon a number of columns of a table; and
   electronically by a processor, partitioning at least one column of the spool based upon the aggregation type of database query received from the client computer system;
   estimating saving of compression based upon statistics associated with the table; and
   compressing certain columns when the estimated saving of compression is greater than a predetermined value.

5. A method according to claim 4, further comprising:
   grouping certain columns together in the partitioning based upon the aggregation type of database query received from the client computer system.

6. A method according to claim 4, further comprising:
   determining if all columns are included in the same partition;
   and partitioning at least one column of the spool only if a determination is made that all columns are not included in the same partition.

7. A method according to claim 4, wherein the method is performed by a computer having a memory executing one or more programs of instructions which are tangibly embodied in a program storage medium readable by the computer.

8. A method of optimizing of a sub-select type of database query which uses spools in a computer system, the method comprising:
   receiving a sub-select type of database query from a client computer system;
   generating a spool based upon a number of columns of a table;
   electronically by a processor, partitioning at least one column of the spool based upon the sub-select type of database query received from the client computer system;
   estimating saving of compression based upon statistics associated with the table; and compressing certain columns when the estimated saving of compression is greater than a predetermined value.

9. A method according to claim 8, further comprising:
grouping certain columns together in the partitioning based upon the sub-select type of database query received from the client computer system.

10. A method according to claim 8, further comprising:
determining if all columns are included in the same partition; and
partitioning at least one column of the spool only if a determination is made that all columns are not included in the same partition.

11. A method according to claim 8, wherein the method is performed by a computer having a memory executing one or more programs of instructions which are tangibly embodied in a program storage medium readable by the computer.

* * * * *